US009202045B2

(12) United States Patent
Fontijn et al.

(10) Patent No.: US 9,202,045 B2
(45) Date of Patent: Dec. 1, 2015

(54) SYSTEM FOR MANAGING ACCESS CONTROL

(75) Inventors: Wilhelmus Franciscus Johannes Fontijn, Eindhoven (NL); Johan Cornelis Talstra, Eindhoven (NL); Philip Steven Newton, Eindhoven (NL); Koen Johanna Guillaume Holtman, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 1616 days.

(21) Appl. No.: 12/093,465

(22) PCT Filed: Nov. 6, 2006

(86) PCT No.: PCT/IB2006/054115
§ 371 (c)(1),
(2), (4) Date: May 13, 2008

(87) PCT Pub. No.: WO2007/057812
PCT Pub. Date: May 24, 2007

(65) Prior Publication Data
US 2008/0282319 A1 Nov. 13, 2008

(30) Foreign Application Priority Data
Nov. 17, 2005 (EP) .................................... 05110841

(51) Int. Cl.
*H04L 29/06* (2006.01)
*G06F 21/53* (2013.01)
*G06F 21/51* (2013.01)
(52) U.S. Cl.
CPC ................ *G06F 21/53* (2013.01); *G06F 21/51* (2013.01)
(58) Field of Classification Search
USPC .......................................... 726/1–2; 713/182
See application file for complete search history.

(56) References Cited

U.S. PATENT DOCUMENTS 6,092,194 A 7/2000 Touboul
6,158,010 A * 12/2000 Moriconi et al. ................. 726/1
(Continued)

FOREIGN PATENT DOCUMENTS

GB 2411320 A 8/2005
JP 2002514326 A 5/2002
(Continued)

OTHER PUBLICATIONS

Sloman, Morris. "Policy driven management for distributed systems." Journal of network and Systems Management 2.4 (1994): 333-360.*
(Continued)

*Primary Examiner* — Harris Wang

(57) ABSTRACT

A content distribution system (300) has access control according to a predefined data access format. The system has organizations (32) for providing content data and related meta data on record carriers (34), and a rendering device (39), and applications for manipulating the content data and related meta data. An access policy for the organization is set according to the predefined data access format, and has access parameters for controlling access to resources of the rendering device and to said content data and related meta data. An organization application (35) complying with the access policy of the organization for accessing said data is executed while accessing the resources of the rendering device according to the access policy of the organization. According to the invention a user access policy is maintained that restricts, for the organization application, access to the resources of the rendering device relative to the access policy of the organization. The user access policy is adjusted based on additional trust data for selectively allowing the organization application to access the resources according to the access policy of the organization. Hence the user controls the access that applications have to resources of the rendering device.

10 Claims, 3 Drawing Sheets

(56) References Cited

U.S. PATENT DOCUMENTS

Figure 1:
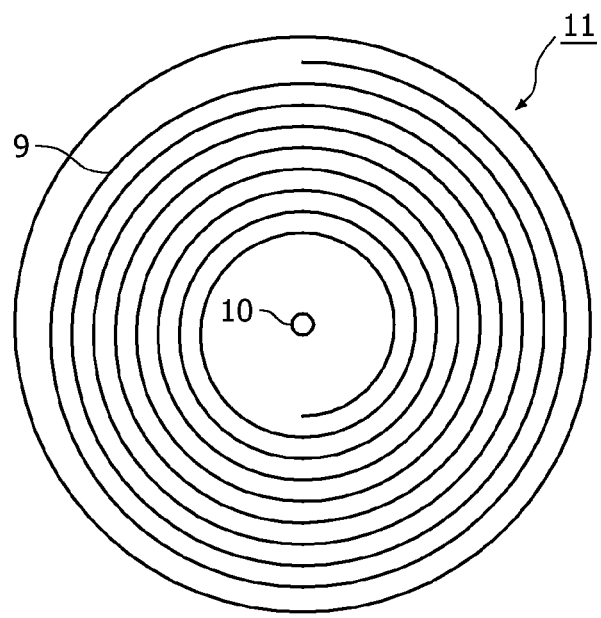

| | | | |
|---|---|---|---|
| 6,321,334 B1* | 11/2001 | Jerger et al. | 726/1 |
| 6,824,051 B2* | 11/2004 | Reddy et al. | 235/380 |
| 7,127,613 B2* | 10/2006 | Pabla et al. | 713/171 |
| 7,272,625 B1* | 9/2007 | Hannel et al. | 709/200 |
| 7,409,569 B2* | 8/2008 | Illowsky et al. | 713/323 |
| 7,437,771 B2* | 10/2008 | Alkove et al. | 726/29 |
| 7,512,965 B1* | 3/2009 | Amdur et al. | 726/1 |
| 7,555,785 B2* | 6/2009 | Levy | 726/28 |
| 7,716,708 B2* | 5/2010 | Nishimura et al. | 725/97 |
| 7,856,652 B2* | 12/2010 | Hieda | 726/1 |
| 7,954,150 B2* | 5/2011 | Croft et al. | 726/21 |
| 2003/0028591 A1* | 2/2003 | Goloshubin et al. | 709/203 |
| 2003/0051169 A1 | 3/2003 | Sprigg et al. | |
| 2004/0006706 A1* | 1/2004 | Erlingsson | 713/200 |
| 2004/0083015 A1* | 4/2004 | Patwari | 700/90 |
| 2004/0117615 A1 | 6/2004 | O'Donnell et al. | |
| 2004/0148514 A1 | 7/2004 | Fee et al. | |
| 2004/0216150 A1 | 10/2004 | Scheifler et al. | |
| 2004/0255147 A1* | 12/2004 | Peled et al. | 713/200 |
| 2005/0039158 A1 | 2/2005 | Koved et al. | |
| 2005/0071663 A1* | 3/2005 | Medvinsky et al. | 713/200 |
| 2005/0183143 A1* | 8/2005 | Anderholm et al. | 726/22 |
| 2005/0216946 A1 | 9/2005 | Johnson | |
| 2005/0223239 A1 | 10/2005 | Dotan | |
| 2006/0150238 A1* | 7/2006 | D'Agostino | 726/1 |
| 2006/0206931 A1* | 9/2006 | Dillaway et al. | 726/9 |
| 2008/0282319 A1* | 11/2008 | Fontijn et al. | 726/1 |

FOREIGN PATENT DOCUMENTS

| | | |
|---|---|---|
| JP | 2010483 | 11/2009 |
| JP | 2004192601 A | 10/2014 |
| TW | 200537862 A | 11/2005 |
| WO | 2005081666 A2 | 9/2005 |

OTHER PUBLICATIONS

Overriding of Access Control in XACML, Alqatawna, J.; Rissanen, E.; Sadighi, B. Policies for Distributed Systems and Networks, 2007. Policy '07. Eighth IEEE International Workshop on Publication Year: 2007, pp. 87-95.*

ECMA-267:120 mm DVD-Read-Only Disk; Standard ECMA—Standardizing Information and Communication Systems, 3rd Edition—Apr. 2001.

Part VII:Examination Guidelines for Inventions in Specific Fields—Japanese Standard—Japanese Patent Office Website, Oct. 2011, 154 Pages Including Translation.

Digital Video Broadcasting (DVB); Multimedia Home Platform (MHP) Specification 1.0.3-ETSI TS 101 812 V1.3.1 Technical Specification, Jun. 2003, 787 Page DOCUMENT.

* cited by examiner

SYSTEM FOR MANAGING ACCESS CONTROL

The invention relates to a method for managing access control in a content distribution system having access control according to a predefined data access format, the system comprising at least one organization for providing content data and related meta data, a rendering device for rendering the content data and related meta data and executing the application, and at least one application for manipulating the content data and related meta data, which method comprises the steps of setting an access policy for the organization according to the predefined data access format, the access policy comprising access parameters for controlling access to resources of the rendering device and to said content data and related meta data, providing at least one organization application complying with the access policy of the organization, providing content data and related meta data complying with the access policy of the respective organization, for enabling the rendering device to execute the organization application while accessing the resources of the rendering device according to the access policy of the organization.

The invention further relates to a computer program product and a rendering device for use in the system. The rendering device comprises rendering means for generating a media signal for rendering the data and related meta data, and access control means for executing the organization application while accessing the resources of the rendering device according to the access policy of the organization.

The invention relates to the field of providing multimedia and interactive applications in a user device by organizations like movie studios. The applications may include rendering images, background video, games, gathering and storing viewing data and text reviews, etc. Commonly such interactive applications are based on stored content data and related meta data according to a predefined format. In particular the invention relates to controlling access to such proprietary data that is usually provided and owned by an organization.

Document US2004/0148514 describes a rendering system, including a storage medium and reproducing method for rendering stored data of interactive applications on a display, for example video. A reading device, such as an optical disc player, retrieves stored information from a record carrier, for example an audio/video (AV) stream including digitally compressed video data. A software publisher (or organization) may provide the content data (for example audio/video) and related meta data (for example playback control data, background text and images, interactive applications, etc). The document describes various ways of controlling access to such data, and implementing an access policy according to a predefined access control format. For example cryptographic methods are described for protecting and controlling access to such data. Digital certificates may be issued by a certification authority. The access policy is particularly suited to control access to the proprietary data by applications provided by the respective publisher or organization. Also the access policy may control access to resources in the rendering device, for example via permissions to access to local storage capacity, a network connection or specific system data.

The access policy according to the known system is established based on the assumption that the applications, it means the organization, behave decently, because the organization has to comply with the access control format. Hence the access control system provides adequate control of applications that access resources or proprietary data for applications provided by the organization, or distributed under the control of the respective organization. However, there is a problem when applications, although originating from a sources that complies with all requirements of the access policy, are misbehaving.

It is an object of the invention to provide an access control system that allows further control of applications that comply with an established access policy in an access controlled environment.

For this purpose, according to a first aspect of the invention, the method, as described in the opening paragraph, further comprises the steps of maintaining a user access policy that restricts, for the organization application, access to the resources of the rendering device relative to the access policy of the organization, and adjusting the user access policy for the organization based on additional trust data for selectively allowing the organization application to access the resources according to the access policy of the organization.

For this purpose, according to a second aspect of the invention, in the device as described in the opening paragraph, the access control means are arranged for maintaining a user access policy that restricts, for the organization application, access to the resources of the rendering device relative to the access policy of the organization, and adjusting the user access policy for the organization based on additional trust data for selectively allowing the organization application to access the resources according to the access policy of the organization.

A user access policy is created for the user of a rendering device. The user access policy is a set of rules and parameters that further restrict access to resources of the rendering device of the user. The additional trust data may be provided in any suitable way, for example actively by the user, from external sources selected by the user, automatically, via the internet, etc. Hence the restrictions of the user access policy are applied for affecting the already accepted and certified access policy applicable for the respective organization application.

The measures have the effect that in the rendering system the user access policy is applied to provide user control of organization applications that are already subject to the access policy of the respective organization, which complies with the access control format. Advantageously, the user has the opportunity to restrict the access to resources in the rendering device if the user does not want such access, although such access is allowable according to the access policy.

The invention is also based on the following recognition. Access control formats for controlling access to proprietary data for the proprietor only, or for specific and predefined third parties, is known, for example from US2004/0148514 as discussed above. Also further systems for distributing multimedia content, such as the BD format (Blu-Ray Optical Disc; a description is available on http://www.blu-raydisc.com, and specifically on http://www.blu-raydisc.com/Section-13628/Index.html, while a Section-13890 contains a specification of the Java programming language for BD), and the MHP standard (Digital video Broadcasting Multimedia Home Platform Specification 1.0.3, ETSI TS 101 812 V1.3.1-2003-06, available from the ETSI website http://www.etsi.org) provide further examples of access control policies. For example the MHP standard allows permissions to be granted to access files or subdirectories, or to use other resources available in a device. In these examples, the access policies are enforced cryptographically.

However the inventors have seen that there is a need for further control by the user. For example, once an access policy has been established for an organization, permissions may be used by the organization also if it is no longer to be trusted. Also organizations may use resources that are acceptable to some users, but not acceptable to other users. The solution provided is that the user access policy is established for additionally controlling access to resources of the rendering device. Some organizations can not be trusted as well as others. The keys of some organization that recently went out of business may still be used to put out content and applications governed by that organization's general access control policy. This content is for obvious reasons of dubious trustworthiness. Or an organization may just be unknown to the user because he is not used to buying movies from this organization. The inventors have seen that the situation is different from the 'untrusted website' issue on the internet, and can not be solved with the same measures as provided by internet browsers. Internet browsers classify sites based on classes (intranet, trusted, restricted), and for each class a level of trust is defined. In the content distribution system an application would be equivalent with a website. But applications cannot be grouped per class like the websites. The inventors have seen that applications can be controlled by providing the user access policy per source, it means per organization. What is acceptable for internet browsers, it means each site is suspect and cannot operate till approved by the user, is not acceptable for multimedia data on a record carrier that has been bought by the user, which record carrier should just play. Advantageously the user access policy provides protection against organization applications of the not trusted, dubious organization, while allowing rendering of distributed content data.

In an embodiment the method comprises maintaining a set of trust data at a remote database entity, and retrieving trust data from the set for the adjusting of the user access policy, and in a particular case the method further comprising accessing the remote database entity via a network. The trust data may be transferred via any suitable carrier, for example via a record carrier, or via the network. Hence a further party that runs the database entity effectively sets the trust data that are applied in the rendering device for setting the user access policy. This has the advantage that the user may once select such a remote database entity for maintaining an up to date set of trust data according to the preferences of the user. Subsequently the user access policy is set automatically based on said retrieved trust data.

In an embodiment of the method the user access policy comprises initially setting a non-trusted level for organizations that are not known in the rendering device, the non-trusted level not allowing the organization application to access said resources. This has the advantage that applications of unknown sources cannot get access to resources unless the user has positively allowed such access by setting a user access policy.

Further preferred embodiments of the device and method according to the invention are given in the appended claims, disclosure of which is incorporated herein by reference.

Figure 2:
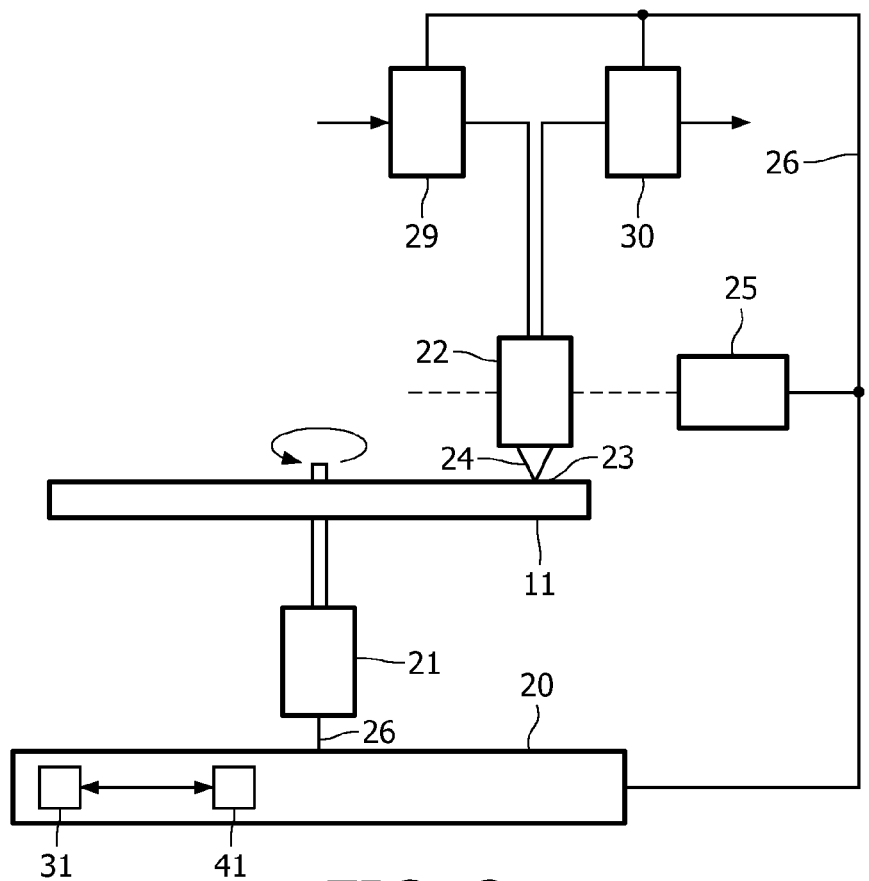
Figure 3:
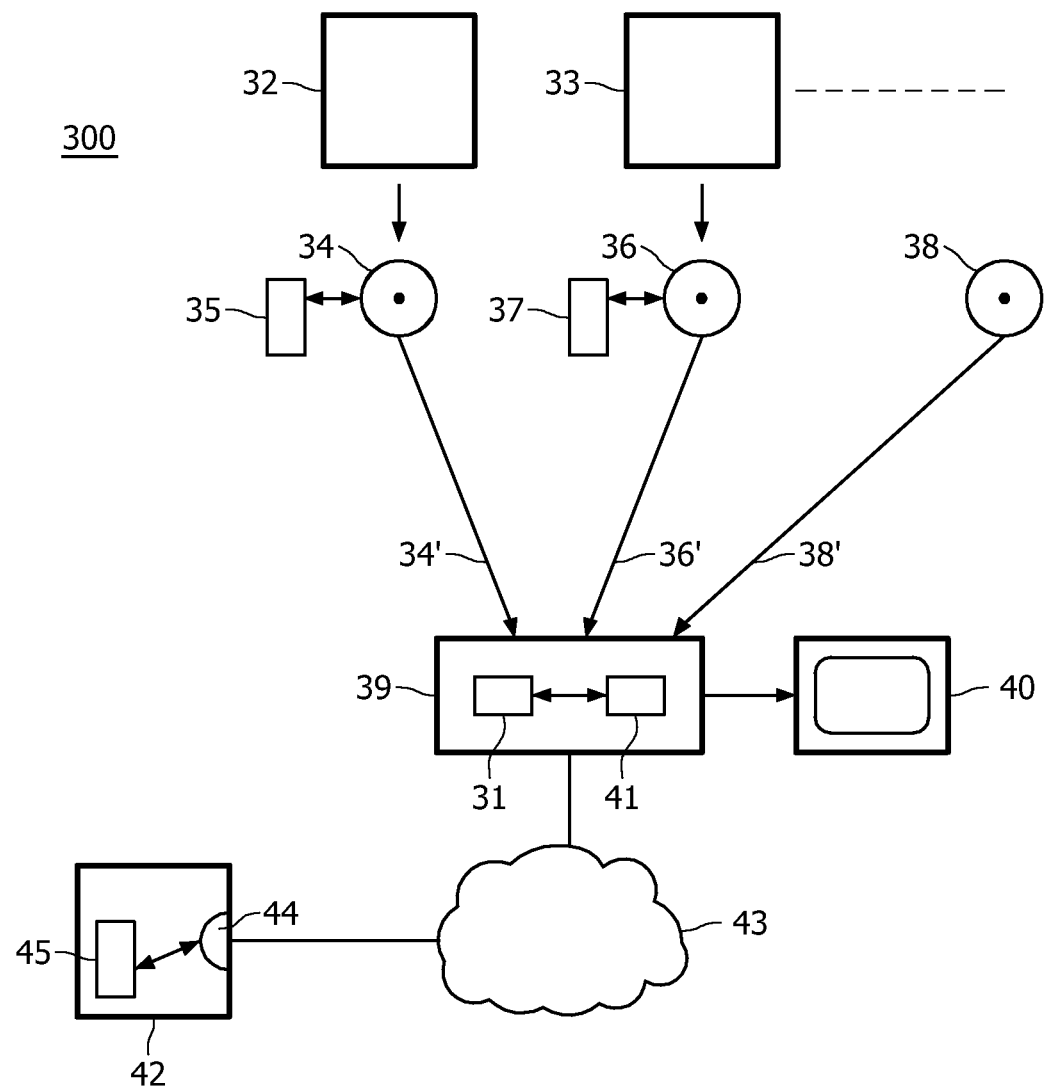
Figure 4:
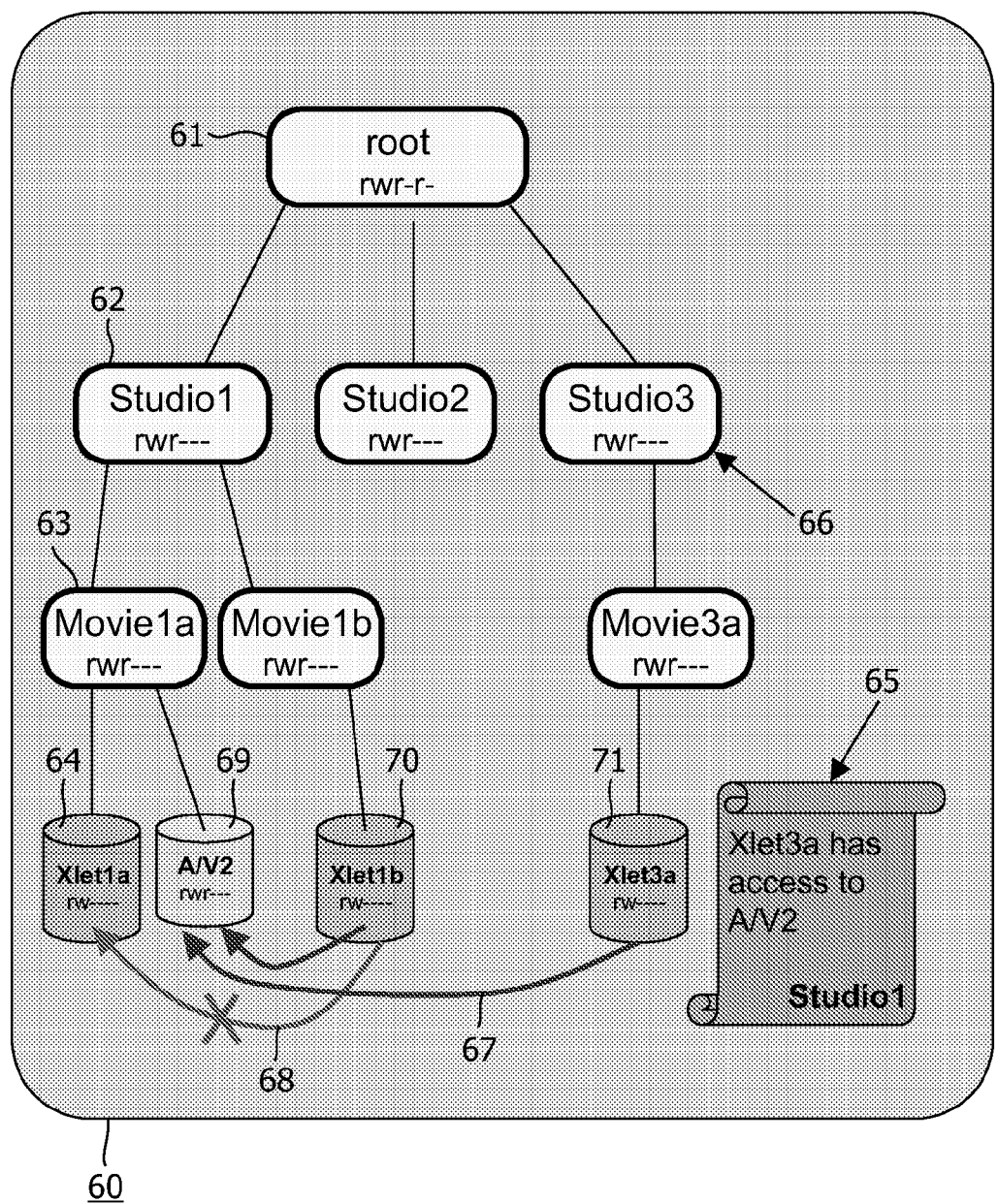

These and other aspects of the invention will be apparent from and elucidated further with reference to the embodiments described by way of example in the following description and with reference to the accompanying drawings, in which FIG. 1 shows a storage medium, FIG. 2 shows a rendering device, FIG. 3 shows a content distribution system having access control according to a predefined data access format, and FIG. 4 shows a file access control mechanism.

Corresponding elements in different Figures have identical reference numerals.

FIG. 1 shows a disc-shaped record carrier 11 having a track 9 and a central hole 10. The track 9, being the position of the series of (to be) recorded marks representing information, is arranged in accordance with a spiral pattern of turns constituting substantially parallel tracks on an information layer. The record carrier may be optically readable, called an optical disc. Examples of an optical disc are the CD and DVD, and the high density optical disc using a blue laser, called Blu-ray Disc (BD). Further details about the DVD disc can be found in reference: *ECMA*-267: 120 *mm DVD-Read-Only Disc*— (1997). The information is represented on the information layer by optically detectable marks along the track.

The record carrier 11 is intended for carrying digital information in blocks under control of a file management system. The information includes real-time information to be reproduced continuously, in particular information representing digitally encoded video like MPEG2 or MPEG4.

In new optical disk standards high definition video may be combined with graphics and applications to create an interactive viewing experience, for example video may be combined with interactive applications to enhance the viewing experience. Typically these applications allow the user to control playback of the video content, get more information on the content being watched or give access to new services. For new services the user devices may have a communication interface for establishing a connection to a network such as the internet. Through this connection the application can, for example, provide e-commerce, gambling and information services on a display device like a television (TV). Also a 'local' non-volatile storage medium like a hard-disk drive (HDD) may be available in the player of each recording medium to store for example the downloaded information.

The storage medium is carrying content information and related meta data according to a predefined data storage format, for example video and related data including virtual objects such as buttons, graphic elements or animations, background information on the content information, additional games or interactive tools, etc. The content data and related meta data are provided by a so-called organization, it means the content provider and/or owner. For the organization the data is called proprietary, it means under control and/or in possession of the respective organization. The predefined data storage format allows data for example on HDD and services such as the communication interface to be access controlled, for example by using cryptographic methods, to be available only according to the copyright provisions applicable. The set of rules and parameters created for the specific organization, according to a predefined data access format, is called an access policy.

FIG. 2 shows a rendering device for reproducing real-time information and active information. The device has read means, which include a head 22 for retrieving the stored information, and scanning means for scanning a track of the record carrier 11 as described above. The scanning means include a drive unit 21 for rotating the record carrier 11, a positioning unit 25 for coarsely positioning the head 22 in the radial direction on the track, and a control unit 20. The head 22 comprises an optical system of a known type for generating a radiation beam 24 guided through optical elements focused to a radiation spot 23 on a track of the information layer of the record carrier. The radiation beam 24 is generated by a radiation source, for example a laser diode. The head further comprises (not shown) a focusing actuator for moving the focus of the radiation beam 24 along the optical axis of said beam and a tracking actuator for fine positioning the spot 23 in a radial direction on the center of the track.

The control unit 20 is connected via control lines 26, for example a system bus, to other units that are to be controlled. The control unit 20 comprises control circuitry, for example a microprocessor, a program memory and control gates, for performing the procedures and functions according to the invention as described below. The control unit 20 may also be implemented as a state machine in logic circuits.

For reading, the radiation reflected by the information layer is detected by a detector of a usual type, for example a four-quadrant diode, in the head 22 for generating a read signal and further detector signals including a tracking error and a focusing error signal for controlling said tracking and focusing actuators. The read signal is processed by a rendering unit 30 for rendering the stored information and generating a display signal for displaying the stored information and accessing virtual objects in the stored information on a display like a monitor or TV set. The displaying includes displaying and executing the virtual objects, for example buttons invoking commands in an interactive user interface or animations during reproducing real-time information.

According to the invention the device has an access control unit 31 for executing applications while accessing resources 41 of the rendering device according to the access policy of the organization. The resources 41 include any feature of the rendering device that may be affected or used by an application, and may include a network connection, for example a modem for connecting to the internet; local storage such as a hard disk or solid state memory for storing application data; various system parameters or device parameters such as parental control settings or sound level; or personal user data, such as user names, family data or credit card data.

Applications are functions made available on the rendering device, usually by an organization via software. Applications may also be provided by different sources, for example the manufacturer of the rendering device, or a general purpose type of application by an independent software company. The specific function of the access control unit 31 according to the invention is maintaining a user access policy that initially restricts, for the organization application, access to the resources 41 of the rendering device relative to the access policy of the organization, and adjusting the user access policy for the organization based on additional trust data for selectively allowing the organization application to access the resources according to the access policy of the organization, which is elucidated further below with reference to FIG. 3.

It is noted that the applications, parts of applications or related functions may be implemented as resident functions in the access control unit. Alternatively, the applications may be provided on the record carrier, via a further information carrier or via a network, for example the internet. The access control unit 31 may be implemented as a software function in the control unit 20, as part of the rendering unit 30, or as a separate unit.

The device may be arranged for writing information on a record carrier 11 of a type, which is writable or re-writable, for example DVD+RW or BD-RE. The device then comprises a write unit 29 for processing the input information to generate a write signal to drive the head 22.

In an embodiment of the rendering system the rendering device may retrieve content data and related meta data from a remote source. The rendering device at the user location may be connectable via a network to a server. The user device, for example a set top box (STB), has a receiver for receiving broadcast data such as video. The user device has a network interface, for example a modem, for connecting the device to a network, for example the internet. A server also has a network interface for connecting the server device to the network. It is noted that user devices that are connectible to a network also include multimedia devices (for example a standardized multimedia home platform MHP), enhanced mobile phones, personal digital assistants, etc.

FIG. 3 shows a content distribution system having access control according to a predefined data access format. The system 300 has a first organization 32 for providing first content data and related meta data, a second organization 33 for providing second content data and related meta data. For distributing content the system further has a first record carrier 34 for carrying the first proprietary data, and a second record carrier 36 for carrying the second proprietary data. Alternatively, the proprietary data or a part of it, such as the related meta data, may be distributed by a different channel, for example a network such as the internet. The first organization 32 may also provide at least one organization application 35 for manipulating the first content data and related meta data. The second organization 33 may also provide at least one organization application 37 for manipulating the corresponding second data.

A rendering device 39 is provided for rendering the content data and related meta data from the record carriers, as indicated by the arrows 34', 36' and 38'. The rendering device may be coupled to a display 40, and to a network 43 via a network interface. In an embodiment, the rendering device 39 receives the content data and/or the related meta data via the network 43. The applications are effectively executed in the rendering device. The applications may be initially included in the rendering device, or may be distributed separately, for example via the network, and stored in the rendering device. It is noted that the record carriers are for carrying the content data and related meta data, but may also carry the applications.

Each organization has a respective access policy, it means a set of parameters and rules according to the predefined access control format. The first organization application 35 is able to access the first proprietary data according to a first access policy, and the second organization application 37 is able to access the second proprietary data. The access policy for an application is set partially by the system (for example application 35 cannot access the data on 'local' storage associated with application 37), and partially by the organization itself (for example organization 32 allows application 37 of organization 33 to access the data associated with application 34). Only licensed organizations have the cryptographic keys to create the latter policies.

It is noted that the system can be extended by further organizations each having respective proprietary data, and corresponding further record carriers 38 and/or applications, while each organization will usually have a number of sets of proprietary data (for example movie productions and corresponding extras for users), while each set (production) is multiplied commercially on a number of record carriers.

The access control unit 31 is additionally arranged for setting a user access policy, for example based on user input via a user interface. The user access policy restricts access to the resources 41 of the rendering device. It is noted that the access policy of the organization is primarily enforced for controlling the access to the resources, as defined in the data access format. The user access policy further affects and restricts said access according to the preferences of the user. The user may explicitly set the preferences to a desired value, or such settings may be set or adjusted based on trust data from external sources. For example the manufacturer of the rendering device may set initial preferences, usually at a safe and restricted level, which may subsequently be changed by the user. Hence the access control unit is arranged for adjusting the user access policy based on additional trust data, and thereby selectively allows the organization application to access the resources up to a maximum allowed level of access determined according to the access policy of the organization.

In an embodiment the content distribution system 300 comprises a remote database entity 42 for maintaining a set of trust data. The remote database entity may be coupled to the rendering device via the network 43, for example the internet, via a network interface 44 for connecting to a network. The database entity 42 has a database unit 45 for storing data, which unit is arranged for maintaining a set of trust data. The maintaining inter alia may include adapting the trust data for organizations that are misbehaving, adding new trust data for new organizations, using user feedback for specific organizations, etc. On request of the rendering device, or automatically or periodically, the database entity transfers a required subset of the trust data from the set to the rendering device via the network interface means 44. Subsequently the rendering device adjusts the user access policy for the organization based on the trust data for selectively allowing the organization application to access the resources according to the access policy of the organization. For example the remote database entity may be provided by the manufacturer of the rendering devices, by a consumer organization, by a privacy awareness group, etc. The access control unit 31 is arranged for retrieving trust data from the set of trust data for the adjusting of the user access policy.

In an embodiment the additional trust data comprises a limited number of trust levels, for example only two: completely trusted or not trusted at all. If the first level is set, the organization application gets full access to the resources according to the settings of the access policy of the organization. If the second level is set, the organization application gets no access at all to the resources, although the settings of the access policy of the organization would allow such access. In a further embodiment the trust levels comprise three levels, it means a fully trusted level for allowing the organization application to fully access to said resources according to the access policy of the organization; a partly trusted level for allowing the organization application to access a predefined subset of resources; and a non-trusted level for not allowing the organization application access to said resources. In addition the access control unit 31 may be arranged for setting the particular access allowed in the partly trusted level, for example access allowed to store data, but no access to credit card data.

In an embodiment the user access policy includes initially setting a non-trusted level for organizations that are not known in the rendering device 39. The non-trusted level does not allow the organization application to access said resources. The access control unit 31 is set to initially block access for any application from a new, unknown organization.

FIG. 4 shows a file access control mechanism. The Figure schematically shows a file system 60, having a root directory 61 and organization subdirectories 62 for a number of organizations. Each organization may have further movie subdirectories 63 for a number of movies. In each directory files may be present, for example in subdirectory 63 "movie 1a" an audio video file 69 and an application file 64 called "Xlet1a", and in further subdirectories an application 70 called "Xlet1b" and an application 71 called "Xlet3a". Each subdirectory or file has permission indicators 66, for example "UNIX permissions", that indicate the rights to read and write for different users that access the subdirectory. According to the data access format each application may have a credential 65, which is an additional amount of data (usually in a separate file) that indicates the access rights, and may contain access parameters, for accessing proprietary information. Note that application 70 (Xlet1b) gets read-access to file 69 (A/V2, which has group read access), but it is not allowed to start application 64 (Xlet1a which only has movie owner-access) as indicated by arrow 68. Application 71 (Xlet3a) is not in the same group (Organization1) as application 64 (Xlet1a) and file 64 (A/V2) so it needs a special credential 65, signed for example by Organization1, to get access to file 64 (A/V2) as indicated by arrow 67.

An embodiment of the data access format as shown in FIG. 4 is based on Java and may be used in a Blu-ray Disc ROM Full Feature Mode. Such BD-ROM players include a Java-Virtual Machine, which can run small applications (programs usually called Xlets). These flexible and powerful rendering machines also have network connections and may have local storage in the form of a Hard Disc Drive (HDD). The content owner, it means organization, can distribute the applications together with the movie on the BD-ROM disc or via a network connection. In the standard access control of such system only the original application that stores any access parameters in a protected memory location (a device resource also called a Key Locker) can retrieve them.

The data access format according to MHP (see above reference) is a subset and extension of Java, to enable running of Java Xlets on Set-top Boxes (STB) for the purpose of browsing, interaction with A/V-data etc. When an application is loaded it is first authenticated by the system. The system subsequently treats the application as a user (based on "application_id") on the system (similar to the Unix operating system), with a home directory, a group to which it belongs ("organization_id"). The application comes with access parameters according to the access policy (called a Permission Request File), through which it requests certain resources from the system (network access, etc.), which may be granted depending on the access policy file.

The data access format subsequently uses these features to define a two-layered access structure to data stored on local storage of the rendering device:

1. Unix-style permission rights: (or default policy) data is stored as files in a normal directory tree. Every file and directory is endowed with read/write access-permissions 66 for each level (see MHP, section 12.6.2.7.2):
a. application (the application that created the data)
b. organization (the applications that belong to the same organization as the creating application).
c. world (all applications)
2. Credential-Mechanism: to override the above mechanism and provide more fine-grained access, the owner of a file(s)/directory can prepare a Credential 65, which is a (signed) statement that another application (for example from another group) can access such file(s)/directory. The Credential 65 is contained in the Permission Request File mentioned above. Upon loading the application, the system may decide, based on the Credential and the policy files that the application should get access to additional files (see MHP, section 12.6.2.6). The above directory/file access control mechanism may be used for a record carrier like BD-ROM. In that case "application_id" corresponds to the applications associated with a particular disc, and "organization_id" corresponds with an organization.

For augmenting the access control mechanism the user access policy is created as described above. A further example is described now. New content distribution systems like the Blu Ray Disc (BD) support Java code to enable interactive applications. The way Java is supported is largely compliant with GEM (Globally Executable MHP, see MHP reference) including the security part. As a result, the security model of BD provides protection of the user from malignant code by signing trusted applications. Organizations certify that the applications that they provide are okay. Either by signing them directly or by certifying that the producer of the software (who signs the software) is legitimate. A certifying authority (CA) in turn certifies that the organization credentials are valid (see below).

The user access policy enables the user to make a distinction between organizations when applying the security policy. Separate user access policies for different organizations (selected based on an organization identifier, for example Organization_ID) enable unrestricted use of resources for applications coming from trusted organizations, somewhat limited use of resources by applications from unknown organizations and very restricted use of resources for applications from organizations that are explicitly not trusted. Note that in the latter case a signed and therefore authenticated application, in other words an application that should get full access according to the data access format, will not get full access because the user does not trust its source. The user access policy in essence revert such applications to unauthenticated applications.

By assigning a level of trust per organization the user access policy automatically assigns the appropriate level of trust for a new application provided it is from an organization for which the user policy has been set. By assigning the lowest level of trust for any new organization all organizations the user policy is set. The user will have the opportunity to upgrade the level of trust for an organization and thereby automatically for all applications of that organization. This way the amount of work for the user in managing trust levels is very limited. Advantageously, this increased convenience of users does not in any way reduce the security of the platform.

Per organization there are certain classification options. In an embodiment a website is created that supports classifying organizations. The website maintains a list of trust data for a large number of organizations. Any dubious organization would be identified as such on the list, as would any trusted organization. Thus the process of classification in the rendering device can be fully automated by contacting such website via the internet, without compromising on security. Note that it is not the intention to block a disc from a dubious organization, just to limit access to certain key recourses (like credit card number or the network connection). Specific applications from specific organizations will have specified levels of access based on the classification of the organization.

A data access format may include the following. Applications to be authenticated are hashed and the hash of the master hash file is signed by encrypting it with the private key of the organization. The signature is put on the disc. The associated public key is contained in an organization certificate, which is also put on disc. The hash of the organization certificate is signed by the Certifying Authority (CA) of which the player has the public key. This signature is also put on the disc. This can be expressed as follows:

$$Signature_{application} = \{hash(hash(application\_code))\}_{key\_private\_organization}$$

$$Certificate_{organization} \approx (key\_public\_organization)$$

$$Signature_{organization\_certificate} = \{hash(Certificate_{organization})\}_{key\_private\_CA}$$

To authenticate Java code in an organization application, the rendering device uses the public key of the CA to verify the signature of the organization certificate. If this checks out the public key of the organization from the organization certificate is used to verify the signature of the application.

There maybe another level of trust in that the producer of the Java code uses its own set of keys to certify the application. In that case the organization needs to sign the certificate of the producer. This can be expressed as follows:

$$Signature_{application} = \{hash(hash(application\_code))\}_{key\_private\_producer}$$

$$Certificate_{producer} \approx (key\_public\_producer)$$

$$Signature_{producer\_certificate} = \{hash(Certificate_{producer})\}_{key\_private\_organization}$$

$$Certificate_{organization} \approx (key\_public\_organization)$$

$$Signature_{organization\_certificate} = \{hash(Certificate_{organization})\}_{key\_private\_CA}$$

It is noted that the access control unit 31 that provides the user access policy functions as described above, may be provided by a computer program product for executing in a user device. The program is operative to cause a processor of the standard user device, for example a laptop computer, to perform the steps of maintaining and adjusting the user access policy. The program may be distributed as a software plug-in, for example via internet, on a record carrier, or send via a broadcast together with any other applications and audio/video content. When loaded the software controls the applications so these access the resources of the device according to the user access policy.

Although the invention has been explained mainly by embodiments based on optical discs other storage media or distribution systems for distributing the content and/or meta data may be applied also. Note however that the invention particularly relates to security policies with respect to data provided by an organization on a user's rendering device. Each organization may be granted an amount of local storage to store data relevant for that organization, and further access to resources. The access policy for that data is that only applications that are verified to be from that organization have access to that data. For example permissions may be granted using the Java language. An application has a permission request file that is compared to the parameter files of the access policy. Previously it was not possible for the user to block dubious or unknown organizations from gaining full access to system resources provided they have a certificate that is valid according to the certifying authority (CA) in place. With the invention, if a requested permission is allowed by the access policy, the respective resource is released to the application, only if also the user access policy allows such access.

It is noted, that in this document the word 'comprising' does not exclude the presence of other elements or steps than those listed and the word 'a' or 'an' preceding an element does not exclude the presence of a plurality of such elements, that any reference signs do not limit the scope of the claims, that the invention may be implemented by means of both hardware and software, and that several 'means' may be represented by the same item of hardware. Further, the scope of the invention is not limited to the embodiments, and the invention lies in each and every novel feature or combination of features described above.

The invention claimed is:
1. A method for managing access control in a content distribution system, the system comprising:
   an organization for providing content data and related meta data; and
   a rendering device for rendering the content data and related meta data and executing an application, said rendering device having controlled access to resources for supplying necessary information for the rendering device to effect performance of predetermined rendering operations;
said method comprising the steps of:
  setting an access policy required to be adhered to by the organization according to a predefined data access format, the access policy comprising access parameters for controlling access by the rendering device to said necessary information;
  providing, in accordance with an access policy actually adhered to by the organization, content data and related meta data and an organization application for manipulating the content data and related meta data, said access policy actually adhered to providing authorization for the rendering device to access said necessary information;
  regardless of whether the access policy actually adhered to by the organization complies with the access policy required to be adhered to, setting a user policy for the rendering device that, while executing the organization application, further restricts access by the rendering device to said necessary information relative to the access policy actually adhered to by the organization; and
  adjusting the user access policy, based on trust data applicable to the organization, for selectively determining what, if any, of said necessary information will be made accessible to the rendering device.

2. The method as claimed in claim 1, wherein the method further comprises the steps of:
  maintaining a set of trust data at a remote database entity; and
  retrieving the trust data applicable to the organization from the set of trust data.

3. The method as claimed in claim 1, wherein the trust data comprises a limited number of trust levels.

4. The method as claimed in claim 3, wherein the trust levels comprise:
  a fully trusted level allowing the organization application full access to said resources of the rendering device, subject to the access policy for the organization;
  a partly trusted level allowing the organization application to access a predefined subset of said resources of the rendering device; and
  a non-trusted level not allowing the organization application access to said resources.

5. The method as claimed in claim 1, wherein the user access policy comprises initially setting a non-trusted level for organizations that are not known in the rendering device, the non-trusted level not allowing the organization application to access said resources subject to said adjusting the user access policy.

6. The method as claimed in claim 1, wherein the resources of the rendering device comprise at least one of:
  a network connection;
  memory locations for storing data;
  system or device parameters; and
  personal user data, such as a name or credit card data.

7. A non-transitory computer-readable storage medium having stored thereon a computer program for causing a processor to manage access control in a content distribution system, the system comprising:
  an organization for providing content data and related meta data; and
  a rendering device for rendering the content data and related meta data and executing an application, said rendering device having controlled access to resources for supplying necessary information for the rendering device to effect performance of predetermined rendering operations;
said computer program causing the processor to perform the steps of:
  setting an access policy required to be adhered to by the organization according to a predefined data access format, the access policy comprising access parameters for controlling access by the rendering device and to said necessary information;
  providing, in accordance with an access policy actually adhered to by the organization, content data and related meta data and an organization application for manipulating the content data and related meta data, said access policy actually adhered to providing authorization for the rendering device to said necessary information;
  regardless of whether the access policy actually adhered to by the organization complies with the access policy required to be adhered to, setting a user access policy for the rendering device that, while executing the organization application, further restricts access by the rendering device to said necessary information relative to the access policy actually adhered to the organization; and
  adjusting the user access policy, based on trust data applicable to the organization, for selectively determining what, if any, of said necessary information will be made accessible to the rendering device.

8. A rendering device for rendering content data and related meta data for use in a content distribution system, the system comprising an organization for providing content data and related meta data;
said system being arranged for:
  setting an access policy required to be adhered to by the organization according to a predefined data access format, the access policy comprising access parameters for controlling access by the rendering device to necessary information for performing predetermined rendering operations;
  providing, in accordance with an access policy actually adhered to by the organization, content data and related meta data and an organization application for manipulating the content data and related meta data, said access policy actually adhered to providing authorization for the rendering device to access said necessary information;
said rendering device further comprising an access control device for:
  regardless of whether the access policy actually adhered to by the organization complies with the access policy required to be adhered to, setting a user access policy for the rendering device that further restricts access by the rendering device to said necessary information relative to the access policy actually adhered to by the organization; and
  adjusting the user access policy, based on trust data applicable to the organization, for selectively determining what, if any, of said necessary information will be made accessible to the rendering device.

9. The rendering device as claimed in claim 8, wherein the access control means:
  accesses a remote database entity via a network, which entity is arranged for maintaining a set of trust data; and
  retrieves trust data from the set for the adjusting of the user access policy.

10. A database entity for use in a content distribution system comprising:
   an organization for providing content data and related meta data; and
   a rendering device for rendering the content data and related meta data, said rendering device having controlled access to resources for supplying necessary information for the rendering device to effect performance of predetermined rendering operations;
the system being arranged for:
   setting an access policy required to be adhered to by the organization according to a predefined data access format, the access policy comprising access parameters for controlling access by the rendering device to said necessary information;
   providing, in accordance with an access policy actually adhered to by the organization, content data and related meta data and an organization application for manipulating the content data and related meta data, said access policy actually adhered to providing authorization for the rendering device to access said necessary information;
   regardless of whether the access policy actually adhered to by the organization complies with the access policy required to be adhered to, setting a user access policy for the rendering device that, while executing the organization application, further restricts access by the rendering device to said necessary information relative to the access policy actually adhered to by the organization; and
   adjusting the user access policy, based on trust data applicable to the organization, for selectively determining what, if any, of said necessary information will be made accessible to the rendering device;
said database entity maintaining said trust data.

* * * * *